United States Patent
Yoon et al.

(10) Patent No.: US 10,637,028 B2
(45) Date of Patent: Apr. 28, 2020

(54) SEPARATOR AND ELECTROCHEMICAL DEVICE COMPRISING SAME

(71) Applicant: LG Chem, Ltd., Seoul (KR)

(72) Inventors: Su-Jin Yoon, Daejeon (KR); Min-Ji Kim, Daejeon (KR)

(73) Assignee: LG Chem, Ltd. (KR)

( * ) Notice: Subject to any disclaimer, the term of this patent is extended or adjusted under 35 U.S.C. 154(b) by 134 days.

(21) Appl. No.: 15/740,129

(22) PCT Filed: Jul. 11, 2016

(86) PCT No.: PCT/KR2016/007531
§ 371 (c)(1),
(2) Date: Dec. 27, 2017

(87) PCT Pub. No.: WO2017/010779
PCT Pub. Date: Jan. 19, 2017

(65) Prior Publication Data
US 2018/0190958 A1  Jul. 5, 2018

(30) Foreign Application Priority Data

Jul. 10, 2015  (KR) .................. 10-2015-0098673

(51) Int. Cl.
| | | |
|---|---|---|
| *H01M 2/16* | (2006.01) | |
| *H01M 10/052* | (2010.01) | |
| *H01G 9/00* | (2006.01) | |
| *H01M 10/0525* | (2010.01) | |
| *H01M 8/0293* | (2016.01) | |

(52) U.S. Cl.
CPC .............. *H01M 2/166* (2013.01); *H01G 9/00* (2013.01); *H01M 2/162* (2013.01); *H01M 2/1653* (2013.01); *H01M 2/1666* (2013.01); *H01M 2/1686* (2013.01); *H01M 10/0525* (2013.01); *H01M 8/0293* (2013.01); *H01M 10/052* (2013.01); *H01M 2300/0068* (2013.01)

(58) Field of Classification Search
CPC .............. H01M 2/166; H01M 2/1686; H01M 10/0525; H01M 10/052
USPC ................................................ 429/332, 144
See application file for complete search history.

(56) References Cited

U.S. PATENT DOCUMENTS

| | | | |
|---|---|---|---|
| 5,415,958 A | 5/1995 | Takahashi et al. | |
| 9,666,851 B2 * | 5/2017 | Ha | H01M 2/1686 |
| 9,786,890 B2 * | 10/2017 | Cho | H01M 2/1686 |
| 10,002,719 B2 * | 6/2018 | Ha | H01G 11/52 |
| 2002/0197536 A1 | 12/2002 | Mori et al. | |
| 2009/0111026 A1 * | 4/2009 | Kim | H01M 2/145 |
| | | | 429/252 |
| 2019/0131604 A1 * | 5/2019 | Yoon | H01M 10/0525 |

FOREIGN PATENT DOCUMENTS

| | | |
|---|---|---|
| KR | 20020096691 A | 12/2002 |
| KR | 20140050877 A | 4/2014 |
| KR | 20150050060 A | 5/2015 |
| KR | 20150059621 A | 6/2015 |

OTHER PUBLICATIONS

Machine Translation of KR 20150050060 A by Kim Jong Hun et al. "A Separator for Electrochemical Device and an Electrochemical Device including the same" (Year: 2015).*
Search report from International Applicaiton No. PCT/KR2016/007531, dated Oct. 20, 2016.

* cited by examiner

*Primary Examiner* — Stewart A Fraser
*Assistant Examiner* — Abibatu O Ojo-Amoo
(74) *Attorney, Agent, or Firm* — Lerner, David, Littenberg, Krumholz & Mentlik, LLP

(57) ABSTRACT

Disclosed are a separator and an electrochemical device comprising the same, the separator comprising: a porous substrate having a plurality of pores; and a porous coating layer formed on at least one surface of the porous substrate and in at least one type of region of the pores of the porous substrate, the porous coating layer containing a plurality of inorganic particles and a binder polymer disposed on a part or the entirety of the surface of the inorganic particles to connect and fix the inorganic particles, wherein the binder polymer contains a copolymer including a vinylidene fluoride-derived repeat unit, a hexafluoropropylene-derived repeat unit, and a maleic acid monomethyl ester-derived repeat unit.

14 Claims, No Drawings

SEPARATOR AND ELECTROCHEMICAL DEVICE COMPRISING SAME

CROSS REFERENCE TO RELATED APPLICATIONS

The present application is a national phase entry under 35 U.S.C. § 371 of International Application No. PCT/KR2016/007531 filed on Jul. 11, 2016, which claims priority from Korean Patent Application No. 10-2015-0098673 filed in the Republic of Korea on Jul. 10, 2015, the disclosures of which are incorporated herein by reference.

TECHNICAL FIELD

The present disclosure relates to a separator and an electrochemical device comprising the same, and more particularly, to a separator with enhanced thermal shrinkage and an electrochemical device comprising the same.

BACKGROUND ART

Recently, there has been an increasing interest in energy storage technology day by day. As the application field of energy storage technology has been extended to mobile phones, camcorders, lap-top computers, and even electric cars, many efforts have been devoted to studying and developing electrochemical devices. In this aspect, electrochemical devices are attracting more attention, and especially, development of rechargeable secondary batteries is the focus of attention, and more recently, in the development of such batteries, new electrode and battery design to improve capacity density and specific energy are mainly studied.

In currently available secondary batteries, lithium secondary batteries developed in early 1990's have higher operating voltage and much higher energy density than traditional batteries using an aqueous electrolyte solution such as batteries, Ni—Cd batteries and $H_2SO_4$—Pb batteries, and by virtue of these advantages, lithium secondary batteries are gaining much attention. However, disadvantages of lithium ion batteries are safety problem such as fires and explosion caused by the use of organic electrolyte solutions and fastidious fabrication.

Novel lithium ion polymer batteries evolved from lithium ion batteries are considered one of the next-generation batteries, but lower capacity than lithium ion batteries and insufficient discharge capacity, especially, at low temperature are issues that must be urgently solved.

Electrochemical devices are produced by many manufacturers, and each shows different safety characteristics. Assessment and management of the safety of electrochemical batteries is very grave. The most important consideration is that electrochemical devices should not cause injury to users in the event of malfunction, and for this purpose, Safety Regulations strictly prohibit fire and flame in electrochemical devices. In the safety characteristics of electrochemical devices, overheating and eventual thermal runaway in electrochemical devices or piercing of separators poses a high risk of explosion. Particularly, polyolefin-based porous substrates commonly used for separators of electrochemical devices show extremely severe thermal shrinking behaviors at the temperature of 100° C. or above due to their properties of materials and manufacturing processes including stretching, causing an electric short circuit between positive and negative electrodes.

To solve the safety problem of electrochemical devices, a separator having a porous organic-inorganic coating layer has been proposed, in which the porous organic-inorganic coating layer is formed by coating a mixture of inorganic particles in excess and a binder polymer on at least one surface of a porous substrate having a plurality of pores.

To solve the safety problem of secondary batteries, there is a demand for a separator in which safety is enhanced by increasing the bonding of the separator, in particular, a porous coating layer of the separator and electrodes, achieving strong integration of the separator and the electrodes, an increase in interfacial resistance between the separator and the electrodes caused by side reactions on the electrodes during cycles is avoided, and air permeability is improved.

DISCLOSURE

Technical Problem

The present disclosure is directed to providing a separator with enhanced safety by increasing the bonding of the separator and electrodes, achieving strong integration of the separator and the electrodes.

The present disclosure is further directed to providing an electrochemical device comprising the separator.

Technical Solution

To achieve the object, according to an aspect of the present disclosure, there is provided a separator of the following embodiment.

A first embodiment is drawn toward a separator including a porous substrate having a plurality of pores, and a porous coating layer formed on at least one area of at least one surface of the porous substrate and the pores of the porous substrate, the porous coating layer including a plurality of inorganic particles and a binder polymer disposed on part or all of the inorganic particles' surface to connect and immobilize the inorganic particles, wherein the binder polymer includes a copolymer with a vinylidenefluoride-derived repeat unit, a hexafluoropropylene-derived repeat unit, and a maleic acid monomethyl ester-derived repeat unit.

A second embodiment is drawn toward the separator according to the first embodiment, wherein the hexafluoropropylene-derived repeat unit is present in an amount of 3 to 25 parts by weight, and the maleic acid monomethyl ester-derived repeat unit is present in an amount of 0.1 to 5 parts by weight, on the basis of 100 parts by weight of the vinylidenefluoride-derived repeat unit.

A third embodiment is drawn toward the separator according to the first or second embodiment, wherein the copolymer has a weight average molecular weight of 100,000 to 1,500,000.

A fourth embodiment is drawn toward the separator according to one of the first to third embodiments, wherein 30 to 70 wt % of the total content of the copolymer is present from a surface of the porous coating layer to a thickness corresponding to 10% of the total thickness of the porous coating layer.

A fifth embodiment is drawn toward the separator according to one of the first to fourth embodiments, wherein the porous substrate is a porous polymer substrate.

A sixth embodiment is drawn toward the separator according to one of the first to fifth embodiments, wherein the porous polymer substrate is at least one of a porous polymer film substrate and a porous polymer nonwoven substrate.

A seventh embodiment is drawn toward the separator according to one of the first to sixth embodiments, wherein the porous substrate has a thickness of 5 to 50 μm, a pore size of 0.01 to 50 μm, and a porosity of 10 to 95%.

An eighth embodiment is drawn toward the separator according to one of the first to seventh embodiments, wherein a weight ratio between the inorganic particles and the binder polymer is from 50:50 to 99:1.

A ninth embodiment is drawn toward the separator according to one of the first to eighth embodiments, wherein the inorganic particles are selected from the group consisting of inorganic particles having a dielectric constant of 5 or greater, inorganic particles having ability to transport lithium ion, and mixtures thereof.

A tenth embodiment is drawn toward the separator according to one of the first to ninth embodiments, wherein the inorganic particles having a dielectric constant of 5 or greater are at least one selected from the group consisting of $BaTiO_3$, $Pb(Zr_x, Ti_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3-xPbTiO_3$ (PMN-PT, $0<x<1$), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, and $TiO_2$.

An eleventh embodiment is drawn toward the separator according to one of the first to tenth embodiments, wherein the inorganic particles having ability to transport lithium ion are at least one selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ ($Li_xSi_yS_z$, $0<x<3$, $0<y<2$, $0<z<4$) based glass, and $P_2S_5$ ($Li_xP_yS_z$, $0<x<3$, $0<y<3$, $0<z<7$) based glass.

A twelfth embodiment is drawn toward the separator according to one of the first to eleventh embodiments, wherein the binder polymer includes at least one selected from the group consisting of polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, and carboxyl methyl cellulose.

According to another aspect of the present disclosure, there is provided an electrochemical device of the following embodiment.

A thirteenth embodiment is drawn toward an electrochemical device including a positive electrode, a negative electrode, and a separator interposed between the positive electrode and the negative electrode, wherein the separator is a separator according to one of the first to twelfth embodiments.

A fourteenth embodiment is drawn toward the electrochemical device according to the thirteenth embodiment, wherein the electrochemical device is a lithium secondary battery.

Advantageous Effects

The separator manufactured according to an aspect of the present disclosure has a binder layer incidentally formed by drying a porous coating layer including a binder having a high adhering ability, without a separate step for forming a binder layer in the manufacturing process, wherein the binder layer has high adherence to the electrodes, thereby avoiding an increase in resistance at the interface with the electrodes, and improving cycling characteristics.

MODE FOR CARRYING OUT THE INVENTION

Hereinafter, the present disclosure will be described in detail The terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

A separator according to an aspect of the present disclosure includes a porous substrate having a plurality of pores; and a porous coating layer formed on at least one area of at least one surface of the porous substrate and the pores of the porous substrate, the porous coating layer including a plurality of inorganic particles and a binder polymer disposed on part or all of the inorganic particles' surface to connect and immobilize the inorganic particles, and the binder polymer includes a copolymer with a vinylidenefluoride-derived repeat unit, a hexafluoropropylene-derived repeat unit, and a maleic acid monomethyl ester-derived repeat unit.

Because the binder polymer of the present disclosure employs a copolymer with a vinylidenefluoride-derived repeat unit, a hexafluoropropylene-derived repeat unit, and a maleic acid monomethyl ester-derived repeat unit, the adherence between the separator and the electrode is guaranteed, and maleic acid functional groups in a slurry containing inorganic particles helps the dispersion of the inorganic particles, thereby improving dispersion of the slurry and preventing sedimentation, and this will bring a great effect in terms of economic efficiency due to a reduction of high-priced dispersible binder conventionally used.

On the basis of 100 parts by weight of the vinylidenefluoride-derived repeat unit, the content of the hexafluoropropylene-derived repeat unit may be 3 to 25 parts by weight, preferably 5 to 20 parts by weight, and more preferably 6 to 15 parts by weight, and the content of the maleic acid monomethyl ester-derived repeat unit may be 0.1 to 5 parts by weight, preferably 0.5 to 4 parts by weight, and more preferably 1 to 3 parts by weight.

When the content of the vinylidenefluoride-derived repeat unit, the hexafluoropropylene-derived repeat unit, and the maleic acid monomethyl ester-derived repeat unit satisfies the range, the adherence between the separator and the electrodes can be guaranteed, and dispersion of the inorganic particles in the slurry can be maintained well.

The copolymer may have a weight average molecular weight of from 100,000 to 1,500,000, preferably from 300,000 to 1,300,000, and more preferably from 600,000 to 1,000,000. When the weight average molecular weight of the copolymer satisfies the range, the adherence between the separator and the electrodes is improved, cycling characteristics and battery capacity are improved, handling problem caused by high viscosity is eliminated, and sedimentation of the inorganic particles in the slurry can be prevented. In this instance, the weight average molecular weight of the copolymer may be measured as a relative value to Standard Polystyrene (PS) sample through Gel Permeation Chromatography (GPC).

The separator according to an embodiment of the present disclosure has an adhesive layer of a binder polymer having a high adhering ability that is incidentally formed on the surface of the porous coating layer while the porous coating layer including the binder polymer is dried, without a separate step for forming an adhesive layer in the manufacturing process, and the adhesive layer has high adherence to the electrodes, thereby avoiding an increase in resistance at the interface with the electrodes, and improving cycling characteristics.

Accordingly, the binder polymer may be distributed at higher density over the surface regions of the porous coating layer attached to the electrodes, rather than being uniformly distributed over the entire porous coating layer, and as a result, the adherence to the electrodes can be improved.

Specifically, 30 to 70 wt % of the total content of the binder polymer, preferably 35 to 65 wt %, and more preferably 40 to 60 wt % may be present from the surface of the porous coating layer to the thickness corresponding to 10% of the total thickness of the porous coating layer.

The porous substrate may be a porous polymer substrate, to be exact, at least one of a porous polymer film substrate and a porous polymer nonwoven substrate.

The porous polymer film substrate may include a porous polymer film made of polyolefin such as polyethylene and polypropylene, and the polyolefin-based porous polymer film substrate exerts a shutdown function, for example, at the temperature of from 80 to 130° C.

In this instance, the polyolefin-based porous polymer film substrate may be formed of polyolefin-based polymer such as polyethylene including high density polyethylene, linear low density polyethylene, low density polyethylene and ultra high molecular weight polyethylene, polypropylene, polybutylene, and polypentene, used singly or in combination.

Furthermore, the porous polymer film substrate may be manufactured by molding in film form using various polymers including polyester besides polyolefin. Furthermore, the porous polymer film substrate may be formed with a stack structure of two or more film layers, and each film layer may be formed of polymer including polyolefin and polyester mentioned above, used singly or in combination.

Furthermore, in addition to polyolefins such as those mentioned above, the porous polymer film substrate and the porous polymer nonwoven substrate may be formed of polyethyleneterephthalate, polybutyleneterephthalate, polyester, polyacetal, polyamide, polycarbonate, polyimide, polyetheretherketone, polyethersulfone, polyphenyleneoxide, polyphenylenesulfide, and polyethylenenaphthalene, used singly or in combination.

The thickness of the porous substrate is not limited to a particular range, but is preferably from 1 to 100 µm, and more preferably from 5 to 50 µm, and the pore size and porosity in the porous substrate is also not limited to a particular range, but the pore size is preferably from 0.01 to 50 µm and the porosity is preferably from 10 to 95%.

According to an embodiment of the present disclosure, in addition to the copolymer with a vinylidenefluoride-derived repeat unit, a hexafluoropropylene-derived repeat unit and a maleic acid monomethyl ester-derived repeat unit, the binder polymer used to form the porous coating layer may further include polymer commonly used to form a porous coating layer in the art.

As above, when the binder polymer further includes polymer, the content of the copolymer in the total content of the binder polymer may be from 5 to 70 wt %, preferably from 10 to 60 wt %, and more preferably from 15 to 50 wt %.

Particularly, the binder polymer may further include polymer having a glass transition temperature ($T_g$) of between −200 and 200° C., and this is because a porous coating layer finally formed can have improved mechanical properties including flexibility and elasticity. This binder polymer faithfully acts as a binder to connect and stably immobilize the inorganic particles, contributing to the prevention of mechanical property degradation in the separator having the porous coating layer.

Furthermore, the binder polymer does not necessarily have the ability to transport ion, but the use of polymer having the ability to transport ion can further improve the performance of electrochemical devices. Accordingly, the binder polymer may use those having a high dielectric constant as possible. In practice, a dissolution rate of salts in an electrolyte solution relies on a dielectric constant of an electrolyte solution solvent, and thus, as the dielectric constant of the binder polymer is higher, a dissolution rate of salts in an electrolyte is improved. The dielectric constant of the binder polymer may range from 1.0 to 100 (measured in frequency=1 kHz), and in particular, 10 or greater.

In addition to the aforementioned function, the binder polymer shows a high degree of swelling in electrolyte solution by gelation when impregnated with liquid electrolyte solution. Accordingly, the binder polymer have a solubility parameter, i.e., Hildebrand solubility parameter, ranging from 15 to 45 $MPa^{1/2}$ or from 15 to 25 $MPa^{1/2}$ and from 30 to 45 $MPa^{1/2}$. Accordingly, hydrophilic polymers with polar groups may be used, rather than hydrophobic polymers such as polyolefins. When the solubility parameter is less than 15 $MPa^{1/2}$ and exceeds 45 $MPa^{1/2}$, it will be difficult to be swollen by a general liquid electrolyte solution for batteries.

Non-limiting examples of the binder polymer include, but are not limited to, polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, and carboxyl methyl cellulose.

The inorganic particles are not particularly limited so long as they are electrochemically stable. That is, the inorganic particles are not particularly limited if they do not cause any oxidation and/or reduction reaction in the operating voltage range (for example, 0~5V for $Li/Li^+$) of an electrochemical device used. Particularly, the use of inorganic particles having the ability to transport ion increases ionic conductivity in electrochemical devices, contributing to the performance improvement.

Furthermore, the use of inorganic particles having a high dielectric constant contributes to the increase in dissolution rate of electrolyte salts, for example, lithium salts, in a liquid electrolyte, thereby increasing ionic conductivity of an electrolyte solution.

By the foregoing reasons, the inorganic particles may include high dielectric constant inorganic particles having a dielectric constant of 5 or greater or a dielectric constant of 10 or greater, inorganic particles having the ability to transport lithium ion, or their mixtures.

Non-limiting examples of the inorganic particles having a dielectric constant of 5 or greater include $BaTiO_3$, Pb($Zr_xTi_{1-x}$)$O_3$ (PZT, 0<x<1), $Pb_{1-x}La_xZr_{1-y}Ti_yO_3$ (PLZT, 0<x<1, 0<y<1), (1-x)Pb($Mg_{1/3}Nb_{2/3}$)$O_3$-xPb$TiO_3$ (PMN-PT, 0<x<1), hafnia (Hf$O_2$), Sr$TiO_3$, Sn$O_2$, Ce$O_2$, MgO, NiO, CaO, ZnO, Zr$O_2$, Si$O_2$, $Y_2O_3$, $Al_2O_3$, SiC, and Ti$O_2$, used singly or in combination.

Particularly, inorganic particles such as Ba$TiO_3$, Pb($Zr_xTi_{1-x}$)$O_3$ (PZT, 0<x<1), $Pb_{1-x}La_xZr_{1-y}Ti_yO_3$ (PLZT, 0<x<1, 0<y<1), (1-x)Pb($Mg_{1/3}Nb_{2/3}$)$O_{3-x}$Pb$TiO_3$ (PMN-PT, 0<x<1), and hafnia (Hf$O_2$) exhibit high dielectric properties of a dielectric constant of 100 or greater, as well as piezo-electricity that is the appearance of a potential difference across two surfaces due to electric charge generated when stretched or compressed by the application of predetermined pressure, thereby preventing the occurrence of an internal short circuit between two electrodes caused by external impacts, contributing to the improvement of safety of electrochemical devices. Furthermore, when the high dielectric constant inorganic particles and the inorganic particles having the ability to transport lithium ion are used in combination, their synergistic effect can be greatly magnified.

The inorganic particles having the ability to transport lithium ion refers to inorganic particles which contain lithium atoms but do not store lithium, and have a function to move lithium ion, and because the inorganic particles having the ability to transport lithium ion can transfer and move lithium ion due to a sort of defect present in the particle structure, it is possible to improve lithium ionic conductivity in batteries, contributing to the improvement of the battery performance. Non-limiting examples of the inorganic particles having the ability to transport lithium ion include lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), (LiAlTiP)$_xO_y$ based glass (0<x<4, 0<y<13) such as 14$Li_2$O-9$Al_2O_3$-38Ti$O_2$-39$P_2O_5$, lithium lanthanum titanate ($Li_x$La$_y$Ti$O_3$, 0<x<2, 0<y<3), lithium germanium thiophosphate ($Li_xGe_yP_zS_w$, 0<x<4, 0<y<1, 0<z<1, 0<w<5) such as $Li_{3.25}Ge_{0.25}P_{0.75}S_4$, lithium nitride ($Li_xN_y$, 0<x<4, 0<y<2) such as $Li_3N$, Si$S_2$ based glass ($Li_xSi_yS_z$, 0<x<3, 0<y<2, 0<z<4) such as $Li_3PO_4$—$Li_2S$—Si$S_2$, $P_2S_5$ based glass ($Li_xP_yS_z$, 0<x<3, 0<y<3, 0<z<7) such as LiI—$Li_2$S—$P_2S_5$, or mixtures thereof.

A weight ratio between the inorganic particles and the binder polymer may range, for example, from 50:50 to 99:1, and may range from 70:30 to 95:5. When the content ratio between the binder polymer and the inorganic particles satisfies the range, the content of the binder polymer increases, and thus the pore size and porosity reduction problem of a coating layer formed can be prevented, and the peel resistance reduction problem of a coating layer caused by the low binder polymer content can be solved.

In addition to the inorganic particles and the polymer, the separator according to an aspect of the present disclosure may further include additives, as the components of the porous coating layer.

The separator according to an embodiment of the present disclosure may be manufactured by preparing a composition for forming a porous coating layer including inorganic particles and a binder polymer, coating the composition on at least one surface of a porous substrate, and drying it.

First, the composition for forming a porous coating layer may be prepared by dissolving a binder polymer in a solvent, and adding and dispersing inorganic particles. The inorganic particles that are pulverized with a preset average particle size may be added, or after inorganic particles may be added to a solution of binder polymer, the inorganic particles may be pulverized, for example, using a ball mill method so that the inorganic particles have a preset, controlled average particle size, and then dispersed.

The method of coating the composition for forming a porous coating layer on the porous substrate is not particularly limited, but various processes including slot coating, dip coating, die coating, roll coating, comma coating, or combination thereof may be used. Particularly, it is desirable to use a slot coating or dip coating method. The slot coating is a process that applies a composition supplied through a slot die over the entire surface of a substrate, and the thickness of a coating layer can be adjusted based on a rate of flow supplied by a quantitative pump. Furthermore, the dip coating is a method that coats a substrate by dipping the substrate in a tank containing a composition, and the thickness of a coating layer can be adjusted based on the concentration of the composition and the speed at which the substrate is taken from the composition tank, and for more accurate coating thickness control, post-metering may be performed through a mayer bar after dipping.

The coating step is preferably performed in a predetermined range of humidity, and the humidity range may be about 10% or higher, preferably 15% or higher, and more preferably 20% or higher. When humidity in the coating step satisfies the range, coating of the composition forming a porous coating layer is good, and subsequently, when the composition is dried to form a porous coating layer, the binder polymer, or the copolymer with a vinylidenefluoride-derived repeat unit, a hexafluoropropylene-derived repeat unit, and a maleic acid monomethyl ester-derived repeat unit, may be differently distributed in the porous coating layer. As a result, 30 to 70 wt % of the total content of the copolymer is present from the surface of the porous coating layer to the thickness corresponding to 10% of the total thickness of the porous coating layer.

The change in distribution of the copolymer in the porous coating layer results from different phase transitions due to water-induced phase separation, and the copolymer having a predetermined amount of hexafluoropropylene-derived repeat unit is present in a larger amount at the outermost of the porous coating layer, because it needs a large amount of non-solvent, i.e., water, required for phase separation and has a relatively slow phase transition rate.

According to an embodiment of the present disclosure, the composition for forming a porous coating layer may be coated on at least one surface of the porous substrate by a dip coating process under the humidity condition of 35% or higher, and dried at 40 to 70° C. to form a coating layer on at least one surface of the porous substrate.

According to an embodiment of the present disclosure, the inorganic particles are closed packed or densely packed in the porous coating layer, so that they are in contact with each other and held together by the binder polymer, and thereby, interstitial volume is formed between the inorganic particles, and the interstitial volume between the inorganic particles becomes voids, which will be pores.

That is, in order to maintain the bond of the inorganic particles, the binder polymer can hold the inorganic particles together, for example, the binder polymer can connect and immobilize the inorganic particles. Furthermore, the pores in the porous coating layer are voids or interstitial volume between the inorganic particles, and may be a space defined by inorganic particles substantially contacting each other in the closed packed or densely packed structure of the inorganic particles.

The pores of the porous coating layer can provide a channel for smooth movement of lithium ion necessary to operate batteries.

Furthermore, to form the closed packed or densely packed structure of the inorganic particles for forming a pore structure attributed to the interstitial volume, a weight ratio between the inorganic particles and the binder polymer in the porous coating layer may be, for example, 50:50 to 99:1, or 70:30 to 95:5. When the weight ratio of the inorganic material to the binder polymer satisfies the range, the thermal stability of the separator is improved, the formation of the interstitial volume between the inorganic particles contributes to the porosity and pore size of the porous coating layer, and the peel resistance of the porous coating layer is improved.

An electrochemical device according to an aspect of the present disclosure includes a positive electrode, a negative electrode, and a separator interposed between the positive electrode and the negative electrode, and the separator is the aforementioned separator according to an embodiment of the present disclosure.

The electrochemical device includes any type of device capable of facilitating electrochemical reactions, and specifically, includes, for example, any type of primary and secondary battery, fuel cell, solar cell or capacitor such as supercapacitor. Particularly, the secondary battery is preferably a lithium secondary battery including a lithium metal secondary battery, a lithium ion secondary battery, a lithium polymer secondary battery or a lithium ion polymer secondary battery.

There is no particular limitation on the two electrodes, the positive electrode and the negative electrode, to be applied with the separator of the present disclosure, and the electrode may be manufactured by binding an electrode active material to a current collector according to common methods known in the art. Of the electrode active material, non-limiting examples of the positive electrode active material include general positive electrode active materials commonly used in a positive electrode of electrochemical devices, and particularly, it is preferred to use lithium manganese oxide, lithium cobalt oxide, lithium nickel oxide, lithium iron oxide, or lithium composite oxide thereof. Non-limiting examples of the negative electrode active material include general negative electrode active materials commonly used in a negative electrode of electrochemical devices, and particularly, lithium intercalation materials such as lithium metal or lithium alloy, carbon, petroleum coke, activated carbon, graphite or other carbon materials are desirable. Non-limiting examples of the positive electrode current collector include foils made of aluminum, nickel or combination thereof, and non-limiting examples of the negative electrode current collector include foils made of copper, gold, nickel or copper alloy or combination thereof.

The electrolyte solution available in the electrochemical device of the present disclosure includes, but is not limited to, electrolyte solutions in which a salt is dissolved or dissociated in an organic solvent, the salt having a structure represented by, for example, $A^+B^-$ where $A^+$ is an alkali metal cation such as $Li^+$, $Na^+$, $K^+$, or combination thereof and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$, or combination thereof, and the organic solvent including propylene carbonate (PC), ethylene carbonate (EC), diethyl carbonate (DEC), dimethyl carbonate (DMC), dipropyl carbonate (DPC), dimethylsulfoxide, acetonitrile, dimethoxy ethane, diethoxy ethane, tetrahydrofuran, N-methyl-2-pyrrolidone (NMP), ethylmethyl carbonate (EMC), gamma-butyrolactone, or mixtures thereof.

The pouring of the electrolyte solution is performed in any suitable step of a battery fabrication process based on a manufacturing process and required properties of a final product. That is, the pouring of the electrolyte solution is applied before battery assembly or in the final step of battery assembly.

Hereinafter, examples are described in detail to specifically explain the present disclosure. The examples of the present disclosure, however, may be modified in many other forms, and the scope of the present disclosure should not be construed as being limited to the following examples. The examples of the present disclosure are provided to explain the present disclosure more fully to those having ordinary knowledge in the art to which the present disclosure pertains.

EXAMPLE 1

5 parts by weight of copolymer (weight average molecular weight: 1,000,000) with 100 parts by weight of vinylidenefluoride-derived repeat unit, 10 parts by weight of hexafluoropropylene-derived repeat unit, and 1.5 parts by weight of maleic acid monomethyl ester-derived repeat unit, as a binder polymer, was added to 95 parts by weight of acetone, and dissolved at 50° C. for about 12 hours or more, to prepare 5 parts by weight of binder polymer solution. Alumina ($Al_2O_3$) particles having an average particle size of 0.5 μm were added to the prepared binder polymer solution at a weight ratio of binder polymer/all inorganic particles=20/80 and dispersed to prepare a composition for forming a porous coating layer.

The prepared composition was coated on two surfaces of a polyethylene porous film (porosity 40%) having a thickness of 12 μm by a dip coating process under the humidity condition of 35%, to manufacture a separator having the porous coating layer of about 4 μm thickness on each surface (the total thickness of the porous coating layer: 8 μm). In this instance, it was found that 50 wt % of the total content of the copolymer was present from the surface of the porous coating layer to the thickness corresponding to 10% of the total thickness of the porous coating layer.

COMPARATIVE EXAMPLE 1

A separator was manufactured by the same method of example 1, except that a copolymer (weight average molecular weight: 800,000) with 100 parts by weight of vinylidenefluoride-derived repeat unit and 10 parts by weight of hexafluoropropylene-derived repeat unit was used as a binder polymer.

Evaluation of Properties

For the separators manufactured in example 1 and comparative example 1, a slurry sedimentation rate, adhesion to electrode, and 150° C. thermal shrinkage were measured by the following methods, and their results are shown in Table 1.

Slurry Sedimentation Rate

A slurry sedimentation rate was measured using the multiple light scattering mechanism of Turbiscan equipment (Formulaction Turbiscan Lab Expert model). After a slurry was prepared, about 10 mL of the slurry was put through a sample inlet in the turbiscan equipment, and measured for 3 hours.

Adhesion to Electrode

An active material [natural graphite and artificial graphite (weight ratio 5:5)], a conductive material [super P], and a binder [polyvinylidenefluoride (PVdF)] were mixed at a weight ratio of 92:2:6 and dispersed in water, and then coated on a copper foil to manufacture a negative electrode, which was tailored to 25 mm*100 mm size.

The separators manufactured in example 1 and comparative example 1 were tailored to 25 mm*100 mm size.

The prepared separator and negative electrode were overlapped and interleaved in a 100 μm PET film, and they were attached together while passing through 70° C. roll laminators. In this instance, heating was performed for 20 seconds at the speed of the roll laminators of 1.5 m/min, and at that time, the pressure was 70 kgf/cm².

After an end of the separator and the negative electrode attached together was mounted in UTM equipment (LLOYD Instrument LF Plus), a force was applied to the separator in two directions, and a force necessary to remove the separator was measured at the measurement speed of 300 mm/min.

150° C. Thermal Shrinkage

After the separators manufactured in example 1 and comparative example 1 were tailored to 50 mm*50 mm size, interposed between A4 papers, and placed in a 150° C. convection oven for 30 minutes, shrinkage in the mechanical direction (MD) and transverse direction (TD) was measured. In this instance, shrinkage was calculated by [(initial length–length after thermal treatment)/(initial length)*100].

TABLE 1

| | Coating thickness (μm) | Slurry sedimentation rate (%/hr) | Adhesion to electrode (gf/25 mm) | 150° C. thermal shrinkage (%, MD/TD) |
| --- | --- | --- | --- | --- |
| Example 1 | 8 | 10.7 | 25 | 15/10 |
| Comparative example 1 | 8 | 56.4 | 10 | 27/20 |

Referring to Table 1, when compared to comparative example 1, the separator of example 1 was found to have great improvement in the dispersion stability of the slurry because of a very low sedimentation rate of the slurry which forms a porous coating layer, and besides, to have dramatic enhancement of the adhesion to electrode and thermal shrinkage.

What is claimed is:

1. A separator comprising:
   a porous substrate having a plurality of pores; and
   a porous coating layer formed on two surfaces of the porous substrate and the pores of the porous substrate, the porous coating layer comprising a plurality of inorganic particles and a binder polymer disposed on part or all of the inorganic particles' surface to connect and immobilize the inorganic particles,
   wherein the binder polymer comprises a copolymer with a vinylidenefluoride-derived repeat unit, a hexafluoropropylene-derived repeat unit, and a maleic acid monomethyl ester-derived repeat unit.

2. The separator according to claim 1, wherein the hexafluoropropylene-derived repeat unit is present in an amount of 3 to 25 parts by weight, and the maleic acid monomethyl ester-derived repeat unit is present in an amount of 0.1 to 5 parts by weight, on the basis of 100 parts by weight of the vinylidenefluoride-derived repeat unit.

3. The separator according to claim 1, wherein the copolymer has a weight average molecular weight of 100,000 to 1,500,000.

4. The separator according to claim 1, wherein 30 to 70 wt % of the total content of the copolymer is present from a surface of the porous coating layer to a thickness corresponding to 10% of the total thickness of the porous coating layer.

5. The separator according to claim 1, wherein the porous substrate is a porous polymer substrate.

6. The separator according to claim 5, wherein the porous polymer substrate is at least one of a porous polymer film substrate and a porous polymer nonwoven substrate.

7. The separator according to claim 1, wherein the porous substrate has a thickness of 5 to 50 μm, a pore size of 0.01 to 50 μm, and a porosity of 10 to 95%.

8. The separator according to claim 1, wherein a weight ratio between the inorganic particles and the binder polymer is from 50:50 to 99:1.

9. The separator according to claim 1, wherein the inorganic particles are selected from the group consisting of inorganic particles having a dielectric constant of 5 or greater, inorganic particles having ability to transport lithium ion, and mixtures thereof.

10. The separator according to claim 9, wherein the inorganic particles having a dielectric constant of 5 or greater are at least one selected from the group consisting of $BaTiO_3$, $Pb(Zr_x, Ti_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3-xPbTiO_3$ (PMN-PT, $0<x<1$), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, and $TiO_2$.

11. The separator according to claim 9, wherein the inorganic particles having ability to transport lithium ion are at least one selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ ($Li_xSi_yS_z$, $0<x<3$, $0<y<2$, $0<z<4$) based glass, and $P_2S_5$ ($Li_xP_yS_z$, $0<x<3$, $0<y<3$, $0<z<7$) based glass.

12. The separator according to claim 1, wherein the binder polymer comprises at least one selected from the group consisting of polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, and carboxyl methyl cellulose.

13. An electrochemical device comprising:
   a positive electrode, a negative electrode, and a separator interposed between the positive electrode and the negative electrode,
   wherein the separator is defined in claim 1.

14. The electrochemical device according to claim 13, wherein the electrochemical device is a lithium secondary battery.

* * * * *